(12) United States Patent
Huang et al.

(10) Patent No.: US 9,241,293 B2
(45) Date of Patent: Jan. 19, 2016

(54) CELL RESELECTION USING ACCESS POINT INFORMATION

(75) Inventors: Ronald K. Huang, San Jose, CA (US); Jason Shi, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 550 days.

(21) Appl. No.: 12/947,787

(22) Filed: Nov. 16, 2010

(65) Prior Publication Data

US 2012/0120922 A1    May 17, 2012

(51) Int. Cl.
*H04W 4/00* (2009.01)
*H04W 36/24* (2009.01)

(52) U.S. Cl.
CPC ..................................... *H04W 36/24* (2013.01)

(58) Field of Classification Search
None
See application file for complete search history.

(56) References Cited

U.S. PATENT DOCUMENTS

| | | | |
|---|---|---|---|
| 6,556,553 B1 | 4/2003 | Palmer et al. | |
| 7,009,952 B1* | 3/2006 | Razavilar et al. | 370/331 |
| 7,103,359 B1 | 9/2006 | Heinonen et al. | |
| 8,121,633 B2 | 2/2012 | Cormier et al. | |
| 8,406,756 B1 | 3/2013 | Reeves et al. | |
| 8,600,956 B2 | 12/2013 | Kuo et al. | |
| 8,774,840 B2 | 7/2014 | Soelberg et al. | |
| 2004/0014422 A1 | 1/2004 | Kallio | |
| 2004/0116110 A1* | 6/2004 | Amerga et al. | 455/422.1 |
| 2004/0136392 A1* | 7/2004 | Diachina et al. | 370/431 |
| 2006/0251023 A1* | 11/2006 | Choi | 370/331 |
| 2007/0173255 A1 | 7/2007 | Tebbit et al. | |
| 2008/0009291 A1* | 1/2008 | Emberson et al. | 455/437 |
| 2009/0323632 A1 | 12/2009 | Nix | |
| 2010/0167658 A1 | 7/2010 | Hoffman | |
| 2010/0216474 A1* | 8/2010 | Park et al. | 455/436 |
| 2010/0284293 A1* | 11/2010 | Watanabe et al. | 370/252 |
| 2010/0291931 A1* | 11/2010 | Suemitsu et al. | 455/436 |
| 2011/0096673 A1* | 4/2011 | Stevenson et al. | 370/252 |

(Continued)

FOREIGN PATENT DOCUMENTS

| | | |
|---|---|---|
| EP | 1 283 651 | 2/2003 |
| WO | 2005089249 | 9/2005 |
| WO | 2006083620 | 8/2006 |

OTHER PUBLICATIONS

Notification of Transmittal of the International Search Report and the Written Opinion of the International Searching Authority, or the Declaration., International application No. PCT/US2011/060633, mailed Mar. 12, 2012, 12 pages.

(Continued)

*Primary Examiner* — Kibrom T Hailu
(74) *Attorney, Agent, or Firm* — Meyertons, Hood, Kivlin, Kowert & Goetzel, P.C.

(57) ABSTRACT

Data provided by an access point of a wireless local area network ("WLAN") is used to assist a mobile device in cell reselection. If a serving cell of a cellular communications network is unsuitable for providing cellular service, a candidate cell co-located with the serving cell can be selected as the serving cell based on quality of service metrics associated with the serving cell and the candidate cell. The mobile device can be proactively commanded to switch to the candidate cell for receiving cellular service. In some implementations, the quality of service metrics are calculated from call logs collected from mobile devices operating in the cellular communications network. In some implementations, network information regarding serving cell performance can be used with the call logs to generate the quality of service metrics.

56 Claims, 4 Drawing Sheets

(56) References Cited

U.S. PATENT DOCUMENTS

| | | |
|---|---|---|
| 2011/0217979 A1 | 9/2011 | Nas |
| 2012/0071167 A1* | 3/2012 | Bhandari ............ 455/443 |
| 2013/0035095 A1 | 2/2013 | Wang et al. |
| 2013/0046738 A1 | 2/2013 | Kuo et al. |
| 2013/0281127 A1 | 10/2013 | Soelberg et al. |
| 2014/0004854 A1 | 1/2014 | Veran et al. |
| 2015/0139074 A1 | 5/2015 | Bane et al. |

OTHER PUBLICATIONS

Gahran, Amy; "Crowdsourced maps help mobile users compare network reliability"; http://www.cnn.com/2011/TECH/mobile/02/15/coverage.mapping/; Feb. 17, 2011; 2 pages.

PRWeb; "DeadCellZones.com Launches a Consumer Cellular Coverage Rating Index"; http://www.prweb.com/releases/2002/3/prweb35525.htm; Mar. 21, 2002; 1 page.

Etherington, Darrell; "Apple Patents Crowdsourced Tracking of Mobile Network Dead Spots"; http://techcrunch.com/2014/11/11/apple-patents-crowdsourced-tracking-of-mobile-network-dead-spots/; Nov. 11, 2014; 2 pages.

Linder, Patrick; "The State of the Mobile Union"; http://www.rootmetrics.com/us/blog/special-reports/the-state-of-the-mobile-union; Mar. 5, 2014; 14 pages.

"Sensorly-Speedtests & 4G/LTE, CDMA, GSM, Wifi coverage & speed maps"; https://www.appannie.com/apps/ios/app/sensorlyspeedtests-4glte-cdma-gsm-wifi-coverage-speed-maps/; Aug. 6, 2012; 2 pages.

Choffnes, et al.; "Crowdsourcing Service-Level Network Event Monitoring"; http://www2.research.att.com/~gezihui/publication/choffnes_sigcomm10.pdf; Aug. 30, 2010; 12 pages.

FCC; "FCC Unveils New, Free Speed Test App to Empower Consumers With U.S. Mobile Broadband Performance Information—App Expands Landmark Measuring Broadband America Program to Mobile, Crowdsources Data to Assess Mobile Broadband Network Performance Nationwide"; https://www.fcc.gov/document/fcc-unveils-mobile-broadband-speed-test-app-empower-consumers; Nov. 14, 2013; 2 pages.

Fitchard, Keith; "Crowdsourced network tester OpenSignal releases on iPhone app" https://gigaom.com/2013/04/18/crowdsourced-network-tester-opensignal-releases-on-iphone-app/; Apr. 18, 2013; 4 pages.

Gember, et al.; "Obtaining In-Context Measurements of Cellular Network Performance"; http://web2.research.att.com/techdocs/TD_100758.pdf; Nov. 14, 2012; 14 pages.

Nokia Networks; "Operators can now crowdsource data on mobile broadband quality" http://networks.nokia.com/news-events/press-room/press-releases/operators-can-now-crowdsource-data-on-mobile-broadband-quality; Nov. 2, 2010; 2 pages.

"Mobile Networks Under Evaluation"; http://www.p3-group.com/downloads/2/4/8/2/9/Interview_connect_P3_July_2014.pdf; Jul. 2014; 3 pages.

Donnelly, Tara; "Optus 'crowdsourcing' to improve network coverage"; http://www.whistleout.com.au/MobilePhones/News/optus-crowdsourcing-to-improve-network-coverage; Jul. 25, 2013; 3 pages.

\* cited by examiner

CELL RESELECTION USING ACCESS POINT INFORMATION

TECHNICAL FIELD

This subject matter is related generally to location aware mobile devices.

BACKGROUND

A modern mobile device can function as a computer and as a cellular telephone. For example, the mobile device can perform traditional computer functions, such as executing application programs, storing various data, and displaying digital images. These functions can be performed in an application subsystem of the mobile device. When the mobile device functions as a cellular telephone, the mobile device can initiate and receive phone calls, identify cellular tower connections, and determine when and whether to switch cellular towers. These functions can be performed in a baseband subsystem of the mobile device. In addition to cellular communication capability, some modern mobile devices include wireless transceivers that allow data to be transmitted and received through access points of a wireless local area network.

SUMMARY

Data provided by an access point of a wireless local area network ("WLAN") is used to assist a mobile device in cell reselection. If a serving cell of a cellular communications network is unsuitable for providing cellular service, a candidate cell co-located with the serving cell can be selected as the serving cell based on quality of service metrics associated with the serving cell and the candidate cell. The mobile device can be proactively commanded to switch to the candidate cell for receiving cellular service.

In some implementations, the quality of service metric is calculated from call logs collected from mobile devices operating in the cellular communications network. In some implementations, network information regarding serving cell performance can be used with the call logs to generate the quality of service metrics. The quality of service metrics can be based on the number or cause of dropped calls by the cell, a number of searches for the cell, or any other factors that indicate reliability or performance of the cell. The quality of service metrics can be at least partially computed by a server and stored in a database accessible by the WLAN or stored in the mobile device. The quality of service metrics can be at least partially computed on the mobile device using information provided by the server or the cellular communications network.

Various implementations disclosed herein provide one or more of the following advantages. In a cellular communications network, cell reselection can be proactively initiated on a mobile device before a radio link failure occurs using information received from an access point of a wireless communications network. The information can indicate the quality of service of cells in the cellular communications network, which can be derived from call logs provided by mobile devices through the wireless communications network, independent of preferences of the carrier for the cellular communications network.

DETAILED DESCRIPTION

System Overview

Figure 1:
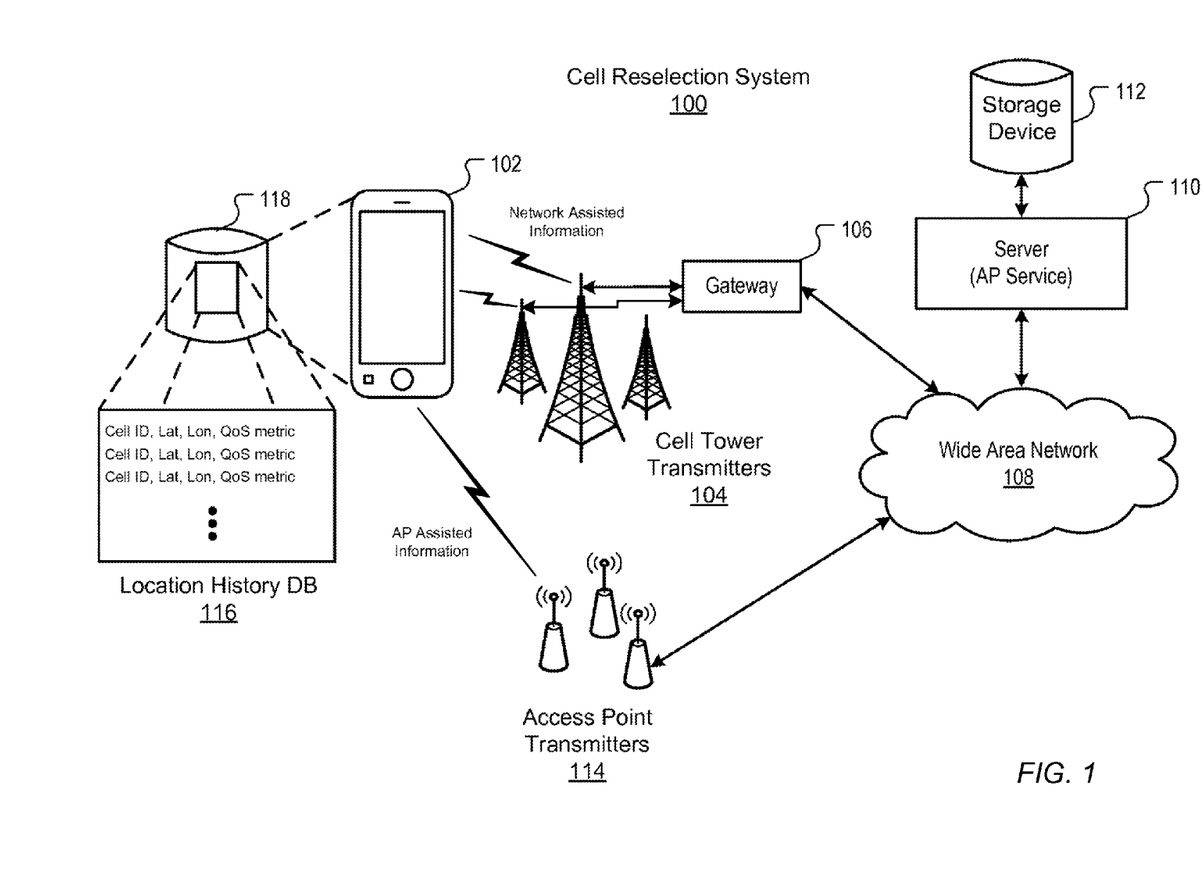
FIG. 1 is a block diagram of an exemplary system for gathering and using access point information to improve cell reselection.

FIG. 1 is a block diagram of an exemplary cell reselection system 100. In some implementations, system 100 can include mobile device 102, cellular tower transmitters 104, access point (AP) transmitters 114 (e.g., WiFi beacons), and server 110. Cellular tower transmitters 104 can be coupled to wide area network 108 (e.g., the Internet) through gateway 106, and AP transmitters 114 can be coupled to network 108 through wired and/or wireless communication links.

Mobile device 102 can be any device capable of cellular communication with a serving cell of a cellular communications network. A cellular communications network is a radio network distributed over geographic areas called "cells." Each cell is served by at least one fixed-location transceiver commonly known as a cell site or base station. When joined together, these cells provide radio coverage over a wide geographic area, enabling a large number of portable transceivers (e.g., mobile phones, pagers, etc.) to communicate with each other and with fixed transceivers and telephones anywhere in the network through base stations.

Some examples of mobile devices capable of cellular communication include but are not limited to: a handheld computer, a personal digital assistant, a cellular telephone, an electronic table, an Internet television, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Server 110 can include one or more server computers operated by a network-based service provider. Server 110 can deliver information to mobile device 102 to assist mobile device 102 in cell reselection. Storage device 112 coupled to server 110 can be used to store the information delivered to mobile device 102, such as information that relates to the quality or performance of a serving cell in the cellular communications network.

In some implementations, mobile device 102 collects and stores network information associated with a transmitter detection event. The network information can include a transmitter identifier and a timestamp marking a time of the transmitter detection event. Some examples of transmitter IDs include but are not limited to Cell IDs provided by cell tower transmitters in a cellular communications network (e.g., transmitters on GSM masts).

A local positioning system onboard the mobile device 102 can compute the location of the transmitter detection event. The positioning technology can be satellite based (e.g., GPS) or networked based (e.g., WiFi positioning). The position coordinates and associated timestamps can be stored in location history database 116 in local storage device 118 and/or network storage device 112 for subsequent retrieval and processing by a user or application.

In some implementations, location history database 116 can be correlated or related to other recorded data (e.g., related using a relational database). A data recording event occurs when data associated with an event is stored in mobile device 102 or on a network storage device (e.g., storage device 112). Some examples of recorded data include but are not limited to: data associated with an application running on the mobile device, a picture taking event, data associated with a financial transaction, sensor output data, data associated with a communication event (e.g., receipt of phone call or instant message), data associated with a network event (e.g., a wired or wireless connection or disconnection with a network), etc.

In some implementations, the transmitter detection event data (e.g., transmitter IDs) are received while mobile device 102 is operating in a low power mode. A lower power mode can occur, for example, when satellite positioning receiver (e.g., a GPS receiver) of mobile device 102 is turned off to conserve power. In low power mode, a power efficient processor (e.g., a 3G baseband processor) can accumulate and store transmitter IDs for computing location history data. Baseband processors are used in radio-frequency (RF) subsystems, such as the RF subsystem 424 shown in FIG. 4. Baseband processors are used to transmit and receive radio signals in, for example, GSM (Global System for Mobile communications), GPRS (General Packet Radio Service) and EGPRS (Enhanced General Packet Radio Service) telecommunication devices, such as cellular mobile phones.

During reception of radio signals, the RF subsystem receives radio signals, converts the radio signals into baseband signals and sends the baseband signals to the baseband processor. Thereafter the baseband processor processes the received baseband signals and decodes various data, including transmitter IDs (e.g., Cell IDs). In many location aware mobile devices, a GPS receiver consumes significantly more power than a baseband processor. Thus, the collecting and storing of transmitter IDs can be achieved by a baseband processor without the high consumption of power associated with, for example, a GPS receiver.

When "camped" on a serving cell in the cellular communications network, mobile device 102 will regularly search for a "better" serving cell according to a cell reselection criteria. If a better serving cell is found, that serving cell is selected for communication services. This process is identified as the 'C2' or 'C32' in the GSM system and 'R' in the Universal Mobile Telecommunications System (UMTS) system. As used herein, a "serving cell" is a cell in a cellular communications network that is currently providing telecommunication and/or data services to mobile device 102. Generally, a serving cell is "better" if it provides a more reliable communication link. A suitable serving cell may be a cell that includes a transmitter that provides a radio signal with a strong signal-to-noise ratio (e.g., in frequently dropped calls), and that also provides a desired communication protocol (e.g., 2G or 3G protocol) for the application running on mobile device 102. For example, mobile device 102 may be running an application that requires the bandwidth of 3G protocol. A serving cell that can only provide 2G protocol would not be suitable for cell reselection.

In a UMTS system, when a cell reselection is triggered, mobile device 102 evaluates a cell reselection criteria based on radio measurements, and if a better cell is found that cell is selected. In some cases, there is built-in preference for certain cells. For example, a serving cell that supports UMTS protocol maybe preferred over a serving cell that supports GSM.

One example where cell reselection is triggered is at radio link failure, where mobile device 102 may trigger an initial cell reselection to request re-establishment of connection with another serving cell. If mobile device is unable to find a suitable cell, mobile device 102 eventually enters idle mode.

A significant problem with the foregoing conventional cell reselection is that the user may experience a dropped call due to radio link failure before cell reselection is completed. Thus, it is more desirable to proactively perform cell reselection before a radio link failure occurs by determining if there is a co-located candidate cell (e.g., a neighboring cell) that can provide a better quality of service (QoS) than the serving cell, and to command mobile device 102 (e.g., command the baseband processor) to use the candidate cell.

To proactively perform cell reselection, mobile device 102 can reset to a new serving cell based on information received through an AP transmitters 114 of a WLAN (e.g., a WiFi network). The AP transmitters 114 can provide a wireless communications link that is independent of the cellular communications link. This information can be collected from call logs of mobile devices that have communicated with the serving cell in the past. The information can include a number of dropped calls, the times when a mobile device is searching for a new serving cell (e.g., recording cell reselection events) or any other information related to the performance or reliability of the serving cell. The information can be tagged with position coordinates and a time stamp. The position coordinates can be taken from onboard or online positioning technologies (e.g., GPS, WiFi, Cell ID). The call logs can include information provided by serving cell transmitters (e.g., Cell IDs). The call logs can be sent to server 110 where the information can be stored by server 110 in storage device 112.

Referring again to FIG. 1, when mobile device 102 is camped on a serving cell, mobile device 102 can query server 110 for a candidate cell co-located (e.g., neighboring) with the serving cell and for QoS information for the candidate cell that can be used to determine if there is a cell reselection opportunity. For example, the QoS information can be a metric that represents a score or rank of a given cell relative to other cells. In some implementations, server 110 can provide mobile device 102 with a list of co-located candidate cells and their respective QoS metrics. The candidate cells can be sorted based on their QoS metrics, such that the candidate cell at the top of the list has the best QoS metric.

In some implementations, a QoS metric can be a summation of weighted factors. For example, a QoS metric, $Q_{Cell\ ID_i}$, can be computed for each cell in a cellular communications network using the formula:

$$Q_{Cell\ ID_i} = \frac{1}{N}\sum_{k=1}^{N} w_k F_k, i = 1 \ldots M, \quad [1]$$

where $F_k$ is a quantified factor associated with the reliability or quality of service provided by a cell with the Cell ID i, $w_k$ is a weight that can be applied to the quantified factor so that the factor contributes more or less to the QoS metric, and M is the number of cells. Some examples of factors are the aggregate number of dropped calls experienced by mobile devices when communicating with a given serving cell, or the aggregate number of cell reselections experienced by mobile devices when communicating with the cell. The factors can be quantized by assigning an integer or other numerical value to the factor. The factors can be normalized before being included in the QoS metric computation [1], so that the QoS metric is a number less than one and thus more easily processed and stored in location history database 116 of storage device 118 of mobile device 102.

In some implementations, the metric of equation [1] can be computed in server 110. The factors can be provided by, or derived from, call logs collected from mobile devices in the past and stored in storage device 112, or from cellular communications network information provided by the carrier. In other implementations, one or more processors onboard mobile device 102 can compute the metric of equation [1]. In such an implementation, the factors and/or weights can be sent to mobile device 102 through AP transmitters 114. In other implementations, both server 110 and mobile device 102 can process a portion of the QoS metric. In some implementations, one or more factors can be used determine a cell reselection opportunity without computing a single QoS metric.

When mobile device 102 receives a list of one or more candidate cells for reselection with corresponding QoS metrics, mobile device compares the highest QoS candidate cell with the QoS of the serving cell. If the candidate cell has a higher QoS metric than the QoS metric of the serving cell, mobile device 102 can initiate cell reselection to the candidate cell. Similarly, if the QoS metric of the candidate cell is lower than the QoS metric of the serving cell, then mobile device can stay camped on the serving cell.

In some implementations, even if the QoS metric is higher for the candidate cell, mobile device 102 may not initiate cell reselection because the candidate cell may not provide a proper protocol for an application running on mobile device 102. For example, if a video streaming application is running, and the serving cell is a 3G cell and the candidate cell is a 2G cell, mobile device 102 can stay camped on the 3G serving cell.

Exemplary Processes For Improved Cell Reselection

Figure 2:
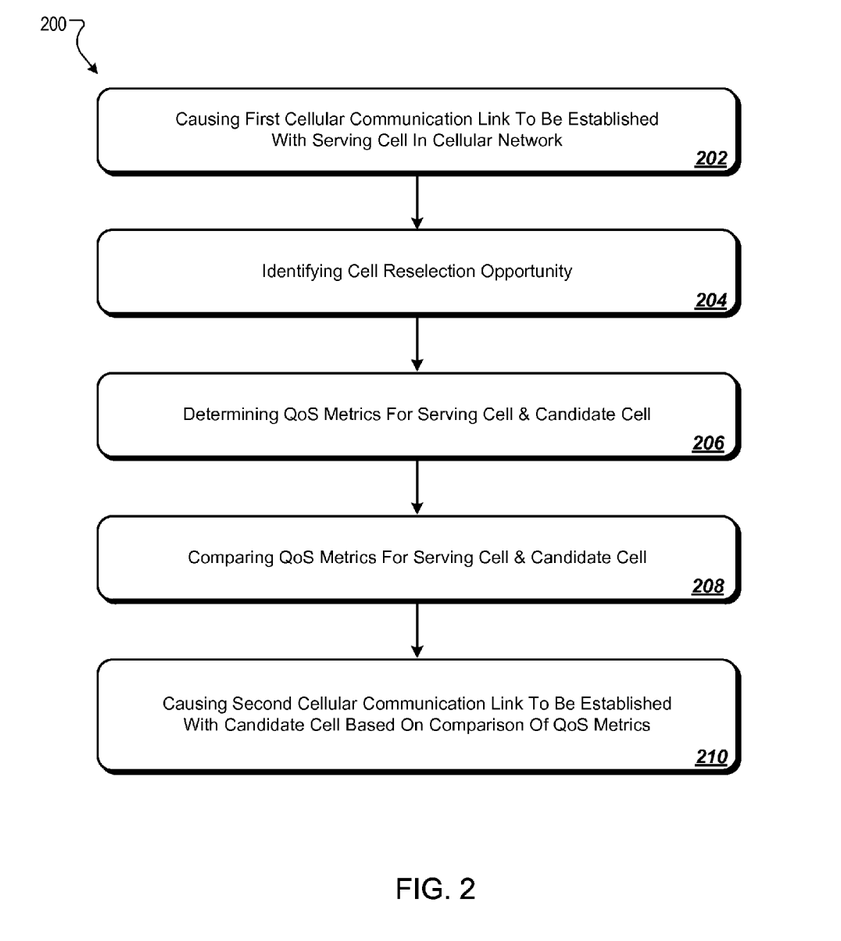
FIG. 2 is a flow diagram of an exemplary process for using access point information to improve cell reselection.

FIG. 2 is a flow diagram of an exemplary process 200 for using access point information to improve cell reselection. In some implementations, process 200 can be performed by one or more processors or processing cores on a mobile device, as described in reference to FIG. 4. Process 200 can include multiple processes that can be run as one or more processing threads of the one or more processors or processing cores of the mobile device. In some implementations, some portions of process 200 can run external to the mobile device, such as on a network server.

In some implementations, process 200 can begin by causing a first cellular communications link to be established between the mobile device and a serving cell in a cellular communications network (202). Process 200 identifies a cell reselection opportunity (204). Identifying a cell reselection opportunity can include querying a database of information over a WLAN. The query can include, or be sent with, position coordinates (e.g., latitude, longitude) and a time stamp. The query can be used to search a database for cell information that can be used in cell reselection by the mobile device. In some implementations, search results include a list of one or more candidate cells that are co-located with the serving cell for the mobile device based on the position coordinates. Each candidate cell can be associated with a QoS metric, which can be calculated as described in reference to equation [1]. The list can be sorted based on the QoS metrics of the candidate cells. For example, a larger QoS metric for a given candidate cell can indicate that the candidate cell is more reliable or provides a higher quality of service (e.g., less dropped calls, a strong SNR) than a candidate cell with a smaller QoS metric.

Process 200 determines QoS metrics for the serving cell and the candidate cell (206). The QoS metrics can be provided in the search results and/or can be computed on the mobile device based on information provided through the WLAN access point (hereinafter also referred to as "AP assisted information"). In some implementations, QoS metrics can be computed using both AP assisted information and information provided by the carrier (hereinafter also referred to as "network assisted information"). An example of network assisted information is the reselection criteria described in 'C2' or 'C32' in the GSM system and 'R ' in the UMTS system.

Process 200 compares the QoS metrics of the serving cell and the candidate cell (208) and causes a second cellular communication link to be established with the candidate cell based on the comparison (210). For example, if the QoS metric computed in equation [1] for the candidate cell is larger than the QoS metric for the serving cell for the mobile device, then the mobile device can initiate cell reselection to the candidate cell. In some implementations, cell reselection can be performed while the mobile device is in idle mode. Idle mode occurs when the mobile device is not engaged in a telephone call or data session.

Figure 3:
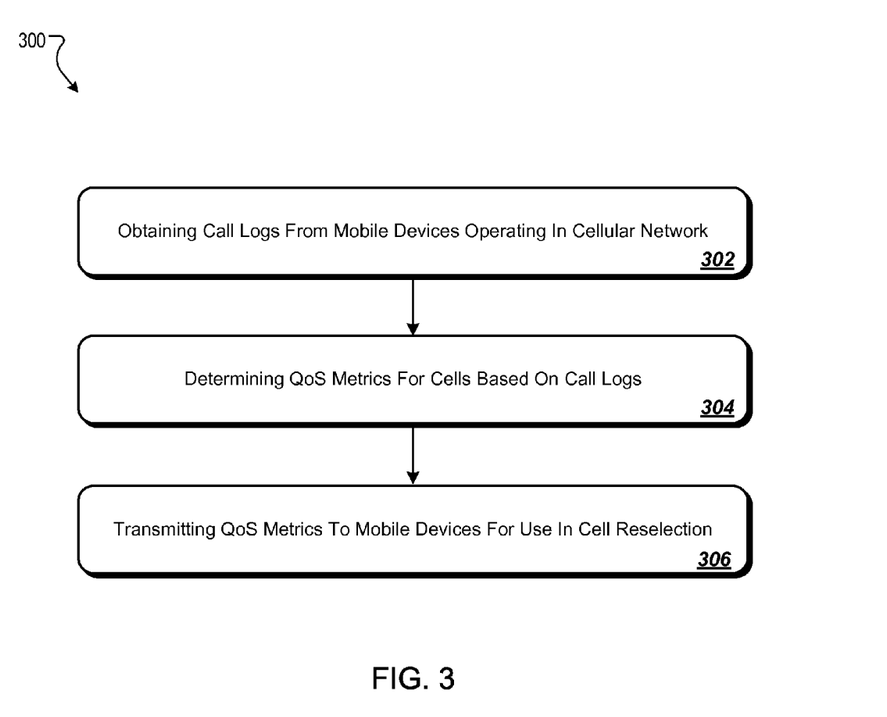
FIG. 3 is a flow diagram of an exemplary process for gathering access point information from mobile devices.

FIG. 3 is a flow diagram of an exemplary process 300 for gathering access point information from mobile devices. In some implementations, process 300 can be performed by one or more processors or processing cores of one or more server computers, such as server 110 of FIG. 1. Process 300 can include multiple processes that can be run as one or more processing threads of the one or more processors or processing cores of the one or more server computers. In some implementations, some portions of process 300 can run on the mobile device 102.

In some implementations, process 300 can begin by obtaining call logs from mobile devices operating in a cellular communications network (302). The call logs can include data collected during transmitter events as previously described in reference to FIG. 1. The data collection can be performed by a software program run by a baseband processor of the mobile device. Data collection can be performed on a scheduled basis or in response to a trigger event. The call logs can be uploaded to a network server (e.g., server 110) on a scheduled basis or in response to a trigger event. Process 300 determines a QoS metric for cells based on the call logs (304). The QoS can be based on statistics (e.g., averages) for call log data. Equation [1] is an example computation for the QoS metric. Other computations are also possible. Process 300 can transmit the QoS metrics to requesting mobile devices in the cellular communications network for use in cell reselection (306).

Example Mobile Device Architecture

Figure 4:
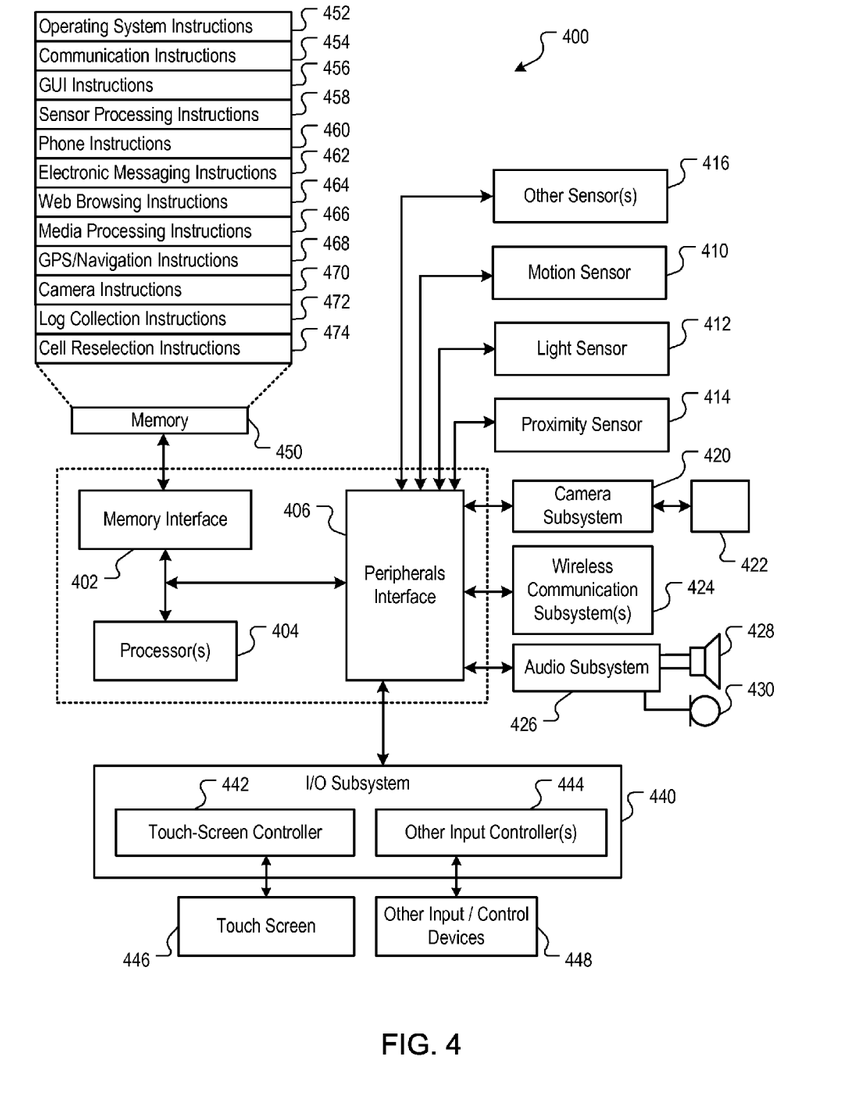
FIG. 4 is a block diagram of an exemplary architecture for a location aware device capable of gathering and using access point information to improve cell reselection.

FIG. 4 is a block diagram of an exemplary architecture 400 for mobile device 102 of FIG. 1. In some implementations, mobile device 102 can include memory interface 402, one or more processors or processing cores 404, and peripherals interface 406. Memory interface 402, processors 404 and peripherals interface 406 can be separate components or can be integrated in one or more integrated circuits. The various components in mobile device 102 can be coupled by one or more communication buses or signal lines.

Sensors, devices, and subsystems can be coupled to peripherals interface 406 to facilitate multiple functionalities. For example, motion sensor 410, light sensor 412, proximity sensor 414 can be coupled to peripherals interface 406 to facilitate orientation, lighting, and proximity functions. Other sensors 416 can also be connected to peripherals interface 406, such as a positioning system (e.g., GPS receiver), a temperature sensor, a biometric sensor, magnetic compass, FM or satellite radio, or other sensing device, to facilitate related functionalities.

Camera subsystem 420 and optical sensor 422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 424, which can include radio frequency receivers and transmitters and/or optical (e.g., infrared) receivers and transmitters. The specific design and implementation of communication subsystem 424 can depend on the communication network(s) over which mobile device 102 is intended to operate. For example, mobile device 102 may include communication subsystems 424 designed to operate over a GSM network, UMTS network, a GPRS network, an EDGE network, a WiFi or WiMax network, and a Bluetooth™ network. In particular, wireless communication subsystems 424 may include hosting protocols such that mobile device 102 may be configured as a base station for other wireless devices.

Audio subsystem 426 can be coupled to speaker 428 and microphone 430 to facilitate voice-enabled functions, such as voice recognition, voice replication, digital recording, and telephony functions.

I/O subsystem 440 can include touch screen controller 442 and/or other input controller(s) 444. Touch-screen controller 442 can be coupled to touch screen 446 or other touch surface or a touch pad. Touch screen 446 and touch screen controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 446.

Other input controller(s) 444 can be coupled to other input/control devices 448, such as one or more buttons, rocker switches, thumb-wheel, infrared port, USB port, and/or a pointer device such as a stylus. One or more buttons (not shown) can include an up/down button for volume control of speaker 428 and/or microphone 430.

In one implementation, a pressing of the button for a first duration may disengage a lock of touch screen 446; and a pressing of the button for a second duration that is longer than the first duration may turn power to mobile device 102 on or off. The user may be able to customize a functionality of one or more of the buttons. Touch screen 446 can, for example, also be used to implement virtual or soft buttons and/or a keyboard. In addition to touch screen 446, mobile device 102 can also include a touch pad.

In some implementations, mobile device 102 can present recorded audio and/or video files, such as MP3, AAC, and MPEG files. In some implementations, mobile device 102 can include the functionality of an MP3 player, such as an iPod™. Mobile device 102 may, therefore, include a connector that is compatible with the iPod™. Other input/output and control devices can also be used.

Memory interface 402 can be coupled to memory 450. Memory 450 can include high-speed random access memory and/or non-volatile memory, such as one or more magnetic disk storage devices, one or more optical storage devices, and/or flash memory (e.g., NAND, NOR). Memory 450 can store an operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 can be a kernel (e.g., UNIX kernel).

Memory 450 may also store communication instructions 454 to facilitate communicating with one or more additional devices, one or more computers and/or one or more servers. Memory 450 may include graphical user interface instructions 456 to facilitate graphic user interface processing, such as described in reference to FIGS. 1-3; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes and instructions; camera instructions 470 to facilitate camera-related processes and functions; and call log collection instructions 472 and cell reselection instructions 474 to facilitate the processes and functions described in reference to FIGS. 1-3. Memory 450 may also store other software instructions (not shown), such as web video instructions to facilitate web video-related processes and functions; and/or web shopping instructions to facilitate web shopping-related processes and functions. In some implementations, media processing instructions 466 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 450 can include additional instructions or fewer instructions. Furthermore, various functions of mobile device 102 may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of what is disclosed here, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by a mobile device, the method comprising:
   causing a first cellular communication link to be established with a serving cell in a cellular communications network;
   identifying a cell reselection opportunity;
   identifying a candidate cell in the cellular communications network and co-located with the serving cell;
   determining and comparing quality of service metrics for the serving cell and the candidate cell based on information received over a wireless communications link from an access point operating in a wireless local area network that is independent of the first cellular communication link; and
   causing a second cellular communication link to be established with the candidate cell based on the quality of service metrics determined and compared, where the method is performed by one or more computer processors of the mobile device and the access point is independent of the second cellular communication link.

2. The method of claim 1, determining quality of service metrics further comprises:
obtaining quality of service information from the cellular communications network; and
determining the quality of service metric based at least in part on the quality of service information.

3. The method of claim 2, determining quality of service metrics further comprises:
obtaining historical data collected from a number of mobile devices operating in the cellular communications network; and
determining the quality of service metric based at least in part on the quality of service information and the historical data.

4. The method of claim 3, where determining quality of service metrics further comprises:
determining a number or cause of dropped calls by the candidate cell based on the historical data; and
determining the quality of service metric based at least in part on the number or cause of dropped calls.

5. The method of claim 3, where determining quality of service metrics further comprises:
determining a number of times that a search is initiated for the candidate cell by the mobile devices; and
determining the quality of service metrics based at least in part on the number of times that a search is initiated for the candidate cell by the mobile devices.

6. The method of claim 1, further comprising:
receiving the quality of service metrics over the wireless communications link.

7. The method of claim 1, where identifying a cell reselection opportunity further comprises:
determining a number of candidate cells co-located with the server cell; and
identifying a cell reselection opportunity based at least in part on the number of candidate cells co-located with the server cell.

8. The method of claim 1, where identifying a cell reselection opportunity further comprises:
determining whether there is an active telephone call being carried on the first cellular communication link; and
identifying a cell reselection opportunity based at least in part on whether there is an active telephone call being carried on the first cellular communication link.

9. The method of claim 1, where identifying a cell reselection opportunity further comprises:
determining a first protocol used by the serving cell on the first cellular communication link;
determining a second protocol used by the candidate cell on the second cellular communication link; and
identifying a cell reselection opportunity based at least in part on a comparison of the first and second communication protocols.

10. The method of claim 1, where identifying a cell reselection opportunity further comprises:
determining activity associated with the mobile device; and
identifying a cell reselection opportunity based at least in part on the determined activity.

11. A method comprising:
obtaining call logs from mobile devices operating in a cellular communications network on a scheduled basis;
determining a quality of service metric for a cell in the cellular communications network based on the call logs, where the quality of service metric includes information for use in cell reselection; and
transmitting, by an access point, the quality of service metric to a requesting mobile device over a wireless communications link independent of the cellular communications network, where the method is performed by one or more computer processors;
wherein the quality of service metric is used by the requesting mobile device in reselecting from a serving cell using a first cellular communication link to a candidate cell using a second cellular communication link.

12. The method of claim 11, where determining a quality of service metric based on the call logs, further comprises:
obtaining quality of service information from the cellular communications network; and
determining the quality of service metric based at least in part on the quality of service information.

13. The method of claim 11, where determining a quality of service metric based on the call logs, further comprises:
determining a number or cause of dropped calls by the cell based on the call logs; and
determining the quality of service metric based at least in part on the number or cause of dropped calls.

14. The method of claim 11, where determining a quality of service metric based on the call logs, further comprises:
determining a number of times that a search is initiated for the cell from the call logs; and
determining the quality of service metric based at least in part on the number of times that a search is initiated for the cell.

15. The method of claim 11, further comprising:
transmitting the quality of service metric to an access point of the wireless communications network.

16. A system comprising:
a processor;
memory coupled to the processor and including instructions, which, when executed by the one or more processors, cause the one or more processors to perform operations comprising:
causing a first cellular communication link to be established with a serving cell in a cellular communications network;
identifying a cell reselection opportunity;
identifying a candidate cell in the cellular communications network and co-located with the serving cell;
determining and comparing quality of service metrics for the serving cell and the candidate cell based on information received over a wireless communications link from an access point operating in a wireless local area network that is independent of the first cellular communication link; and
causing a second cellular communication link to be established with the candidate cell based on the quality of service metrics determined and compared, where the access point is independent of the second cellular communication link.

17. The system of claim 16, determining quality of service metrics further comprises:
obtaining quality of service information from the cellular communications network; and
determining the quality of service metric based at least in part on the quality of service information.

18. The system of claim 17, determining quality of service metrics further comprises:
obtaining historical data collected from a number of mobile devices operating in the cellular communications network; and determining the quality of service metric based at least in part on the quality of service information and the historical data.

19. The system of claim 18, where determining quality of service metrics further comprises:
   determining a number or cause of dropped calls by the serving cell based on the historical data; and
   determining the quality of service metric based at least in part on the number or cause of dropped calls.

20. The system of claim 18, where determining quality of service metrics further comprises:
   determining a number of times that a search is initiated for the serving cell by the mobile devices; and
   determining the quality of service metric based at least in part on the number of times that a search is initiated for the serving cell by the mobile devices.

21. The system of claim 16, further comprising:
   receiving the quality of service metrics over the wireless communications link that is independent of the first and second cellular communication links.

22. The system of claim 16, where identifying a cell reselection opportunity further comprises:
   determining a number of candidate cells co-located with the server cell; and
   identifying a cell reselection opportunity based at least in part on the number of candidate cells co-located with the serving cell.

23. The system of claim 16, where identifying a cell reselection opportunity further comprises:
   determining whether there is an active telephone call being carried on the first cellular communication link; and
   identifying a cell reselection opportunity based at least in part on whether there is an active telephone call being carried on the first cellular communication link.

24. The system of claim 16, where identifying a cell reselection opportunity further comprises:
   determining a first protocol used by the serving cell on the first cellular communication link;
   determining a second protocol used by the candidate cell on the second cellular communication link; and
   identifying a cell reselection opportunity based at least in part on a comparison of the first and second communication protocols.

25. The system of claim 16, where identifying a cell reselection opportunity further comprises:
   determining user activity associated with the mobile device; and
   identifying a cell reselection opportunity based at least in part on the determined user activity.

26. A system comprising:
   a processor;
   memory coupled to the processor and including instructions, which, when executed by the one or more processors, cause the one or more processors to perform operations comprising:
   obtaining call logs from mobile devices operating in a cellular communications network;
   determining quality of service metrics for a serving cell and a candidate cell in the cellular communications network based on the call logs, where the quality of service metric include information for use in cell reselection; and
   transmitting, by an access point, the quality of service metrics to a requesting mobile device over a wireless communications link independent of the cellular communications network;
   wherein the quality of service metric are used by the requesting mobile device in reselecting from a serving cell using a first cellular communication link to a candidate cell using a second cellular communication link.

27. The system of claim 26, where determining quality of service metrics based on the call logs, further comprises:
   obtaining quality of service information from the cellular communications network; and
   determining the quality of service metrics based at least in part on the quality of service information.

28. The system of claim 26, where determining quality of service metrics based on the call logs, further comprises:
   determining a number or cause of dropped calls by the serving cell based on the call logs; and
   determining the quality of service metrics based at least in part on the number or cause of dropped calls.

29. The system of claim 26, where determining quality of service metrics based on the call logs, further comprises:
   determining a number of times that a search is initiated for the serving cell from the call logs; and
   determining the quality of service metrics based at least in part on the number of times that a search is initiated for the serving cell.

30. The system of claim 26, further comprising:
   transmitting the quality of service metrics to an access point of the wireless communications network.

31. A method performed by a mobile device, the method comprising:
   causing a first cellular communication link to be established with a serving cell in a cellular communications network;
   identifying a cell reselection opportunity;
   identifying a candidate cell in the cellular communications network and co-located with the serving cell;
   receiving quality of service information over a wireless communications link from an access point operating in a wireless local area network that is independent of the cellular communications network;
   comparing the quality of service information for the serving cell and the candidate cell; and
   causing a second cellular communication link to be established with the candidate cell based on the comparing, where the method is performed by one or more computer processors of the mobile device.

32. The method of claim 31,
   wherein the quality of service information comprises quality of service metrics obtained from the cellular communications network.

33. The method of claim 31,
   wherein the quality of service information is determined based on historical data collected from a plurality of mobile devices operating in the cellular communications network.

34. The method of claim 33,
   where the quality of service information is determined based on a number or cause of dropped calls by the candidate cell based on the historical data.

35. The method of claim 33,
   where the quality of service information is determined based on a number of times that a search is initiated for the candidate cell by the mobile devices.

36. The method of claim 31, where identifying a cell reselection opportunity further comprises:
   determining a first protocol used by the serving cell on the first cellular communication link;
   determining a second protocol used by the candidate cell on the second cellular communication link; and identifying a cell reselection opportunity based at least in part on a comparison of the first and second communication protocols.

37. A system comprising:
an antenna for performing wireless cellular communications;
a processor coupled to the antenna; and
memory coupled to the processor and including instructions, which, when executed by the one or more processors, cause the one or more processors to:
establish a first cellular communication link with a serving cell in a cellular communications network;
identify a cell reselection opportunity;
identify a candidate cell in the cellular communications network and co-located with the serving cell;
receive quality of service information over a wireless communications link from an access point operating in a wireless local area network that is independent of the first cellular communication link;
compare the quality of service information for the serving cell and the candidate cell; and
cause a second cellular communication link to be established with the candidate cell based on the comparing, where the access point is independent of the second cellular communication link.

38. The system of claim 37,
wherein the quality of service information comprises quality of service metrics obtained from the cellular communications network.

39. The system of claim 38,
wherein the quality of service information is determined based on historical data collected from a plurality of mobile devices operating in the cellular communications network.

40. The system of claim 39,
where the quality of service information is determined based on a number or cause of dropped calls by the candidate cell based on the historical data.

41. The system of claim 39,
where the quality of service metrics are determined based on a number of times that a search is initiated for the candidate cell by the mobile devices.

42. The system of claim 37, where identifying a cell reselection opportunity further comprises:
determining a first protocol used by the serving cell on the first cellular communication link;
determining a second protocol used by the candidate cell on the second cellular communication link; and
identifying a cell reselection opportunity based at least in part on a comparison of the first and second communication protocols.

43. A method performed by a mobile device, the method comprising:
causing a first cellular communication link to be established with a serving cell in a cellular communications network;
identifying a cell reselection opportunity;
receiving quality of service information of at least one candidate cell in the cellular communications network, wherein the quality of service information is received in a wireless manner, wherein the quality of service information is obtained based on call information collected from a plurality of mobile devices operating in the cellular communications network;
comparing the quality of service information for the serving cell and the candidate cell; and
causing a second cellular communication link to be established with the candidate cell based on the comparing, where the method is performed at least in part by one or more computer processors of the mobile device.

44. The method of claim 43,
wherein said receiving comprises receiving the quality of service information from an access point over a wireless local area network, wherein the wireless local area network is independent of the cellular communications network.

45. The method of claim 43,
wherein the quality of service information comprises one or more quality of service metrics.

46. The method of claim 43,
wherein the quality of service information is based at least in part on a number or cause of dropped calls by the at least one candidate cell.

47. The method of claim 43,
wherein the quality of service information is based at least in part on a number of times that a search is initiated for the candidate cell by the mobile devices.

48. A method comprising: obtaining call logs from a plurality of mobile devices operating in a cellular communications network; determining a quality of service metric for at least one cell in the cellular communications network based on the call logs, where the quality of service metric includes information for use in cell reselection; and transmitting the quality of service metric to a mobile device in a wireless manner, where the method is performed by one or more computer processors; wherein the quality of service metric is used by the mobile device in reselecting from a serving cell using a first cellular communication link to a candidate cell using a second cellular communication link.

49. The method of claim 48, where determining a quality of service metric based on the call logs, further comprises:
determining a number or cause of dropped calls by the cell based on the call logs; and
determining the quality of service metric based at least in part on the number or cause of dropped calls.

50. The method of claim 48, where determining a quality of service metric based on the call logs, further comprises:
determining a number of times that a search is initiated for the cell from the call logs; and
determining the quality of service metric based at least in part on the number of times that a search is initiated for the cell.

51. The method of claim 48, further comprising:
transmitting the quality of service metric to an access point of a wireless local area network;
wherein said transmitting the quality of service metric to the mobile device in a wireless manner comprises the access point transmitting the quality of service metric to the mobile device over the wireless local area network.

52. A method performed by a mobile device, the method comprising:
causing a first cellular communication link to be established with a serving cell in a cellular communications network;
identifying a cell reselection opportunity;
identifying a candidate cell in the cellular communications network and co-located with the serving cell;
receiving quality of service information for the candidate cell in a wireless manner, wherein the quality of service information is determined least in part from historical data collected from a number of mobile devices operating in the cellular communications network;

comparing the quality of service information for the serving cell and the candidate cell; and causing a second cellular communication link to be established with the candidate cell based on the comparing, where the method is performed by one or more computer processors of the mobile device.

53. A mobile device, comprising:

an antenna for performing wireless cellular communications in a cellular communications network;

at least one radio coupled to the antenna; and a processor coupled to the at least on radio;

wherein the mobile device is configured to:

establish a first cellular communication link with a serving cell in the cellular communications network;

identify a cell reselection opportunity;

receive quality of service information of at least one candidate cell in the cellular communications network, wherein the quality of service information is received in a wireless manner, wherein the quality of service information is obtained based on call information collected from a plurality of mobile devices operating in the cellular communications network;

compare the quality of service information for the serving cell and the candidate cell; and     establish a second cellular communication link with the candidate cell based on the comparing.

54. The mobile device of claim 53, wherein the quality of service information comprises quality of service metrics obtained from the cellular communications network.

55. The mobile device of claim 53, where the quality of service information is determined based on a number or cause of dropped calls by the candidate cell.

56. The mobile device of claim 53, where the quality of service information is determined based on a number of times that a search is initiated for the candidate cell by the mobile devices.

\* \* \* \* \*